United States Patent
Meng et al.

(10) Patent No.: US 11,107,460 B2
(45) Date of Patent: Aug. 31, 2021

(54) ADVERSARIAL SPEAKER ADAPTATION (71) Applicant: Microsoft Technology Licensing, LLC, Redmond, WA (US)

(72) Inventors: Zhong Meng, Seattle, WA (US); Jinyu Li, Redmond, WA (US); Yifan Gong, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 247 days.

(21) Appl. No.: 16/460,027

(22) Filed: Jul. 2, 2019

(65) Prior Publication Data

US 2020/0335085 A1 Oct. 22, 2020

Related U.S. Application Data (60) Provisional application No. 62/834,564, filed on Apr. 16, 2019.

(51) Int. Cl.
*G10L 15/06* (2013.01)
*G10L 15/02* (2006.01)
(Continued)

(52) U.S. Cl.
CPC ............ *G10L 15/063* (2013.01); *G10L 15/02* (2013.01); *G10L 15/22* (2013.01); *G10L 15/16* (2013.01); *G10L 2015/025* (2013.01)

(58) Field of Classification Search
CPC ....... G10L 15/16; G10L 15/063; G10L 15/02; G10L 15/22; G10L 2015/025
See application file for complete search history.

(56) References Cited

U.S. PATENT DOCUMENTS 9,984,682 B1 * 5/2018 Tao .................. G09B 19/04
10,008,209 B1 * 6/2018 Qian .................. G10L 17/18
(Continued)

OTHER PUBLICATIONS

Abdel-Hamid, et al., "Fast Speaker Adaptation of Hybrid NN/HMM Model for Speech Recognition Based on Discriminative Learning of Speaker Code", In Proceedings of the IEEE International Conference on Acoustics, Speech and Signal Processing (ICASSP), May 26, 2013, 5 Pages.

(Continued)

*Primary Examiner* — Michael Colucci
(74) *Attorney, Agent, or Firm* — Buckley, Maschoff & Talwalkar LLC (57) ABSTRACT

Embodiments are associated with a speaker-independent acoustic model capable of classifying senones based on input speech frames and on first parameters of the speaker-independent acoustic model, a speaker-dependent acoustic model capable of classifying senones based on input speech frames and on second parameters of the speaker-dependent acoustic model, and a discriminator capable of receiving data from the speaker-dependent acoustic model and data from the speaker-independent acoustic model and outputting a prediction of whether received data was generated by the speaker-dependent acoustic model based on third parameters. The second parameters are initialized based on the first parameters, the second parameters are trained based on input frames of a target speaker to minimize a senone classification loss associated with the second parameters, a portion of the second parameters are trained based on the input frames of the target speaker to maximize a discrimination loss associated with the discriminator, and the third parameters are trained based on the input frames of the target speaker to minimize the discrimination loss.

20 Claims, 8 Drawing Sheets

(51) Int. Cl.
    G10L 15/22    (2006.01)
    G10L 15/16    (2006.01)

(56) References Cited

U.S. PATENT DOCUMENTS

| | | | | |
|---|---|---|---|---|
| 10,699,698 | B2* | 6/2020 | Qian | G10L 15/16 |
| 2006/0058999 | A1* | 3/2006 | Barker | G09B 19/04 |
| | | | | 704/256 |
| 2018/0082692 | A1* | 3/2018 | Khoury | G10L 17/20 |
| 2018/0254040 | A1* | 9/2018 | Droppo | G10L 17/18 |
| 2019/0147320 | A1* | 5/2019 | Mattyus | G06K 9/627 |
| | | | | 382/155 |
| 2020/0302176 | A1* | 9/2020 | Yang | G06K 9/4628 |
| 2020/0357096 | A1* | 11/2020 | Gao | G06T 5/20 |

OTHER PUBLICATIONS

Bousmalis, et al., "Domain Separation Networks", In Proceedings of 30th Conference on Neural Information Processing Systems, Dec. 5, 2016, 15 Pages.
Ganin, et al. "Unsupervised Domain Adaptation by Backpropagation", In Journal of Computing Research Repository, Sep. 26, 2014, 11 Pages.
Gemello, et al., "Linear Hidden Transformations for Adaptation of Hybrid ANN/HMM Models", In Journal of Speech Communication, vol. 49, No. 10-11, Oct. 1, 2007, 20 Pages.
Goodfellow, et al., "Generative Adversarial Nets", In Journal of Advances in neural information processing systems, Dec. 8, 2014, 9 Pages.
Hinton, et al.,, "Deep Neural Networks for Acoustic Modeling in Speech Recognition", In Proceedings of IEEE Signal Processing Magazine, Nov. 2012, pp. 82-97, 27 Pages.
Huang, et al., "Maximum a Posteriori Adaptation of Network parameters in deep models", In Proceedings of International Speech Communication Association, Sep. 6, 2015, 5 Pages.
Huang, et al., "Rapid Adaptation for deep neural networks through multi-task learning", In Sixteenth Annual Conference of the International Speech Communication Association, 2015, 5 Pages.
Kullback, et al., "On information and sufficiency", In Proceedings of he annals of mathematical statistics, Mar. 1, 1951, pp. 79-86, 8 Pages.
Kurt, Will, "Kullback-leibler divergence explained", Retrieved from: https://www.countbayesie.com/blog/2017/5/9/kullback-leibler-divergence-explained, 2017, 19 Pages.
Li, et al., "Feature engineering in context-dependent deep neural networks for conversational speech transcription", In Proceedings of IEEE Workshop on Automatic Speech Recognition Understanding, Dec. 11, 2011, pp. 24-29, 6 Pages.
Liao, et al., "Speaker Adaptation of Context Dependent Deep Neural Networks", In International Conference on Acoustics, Speech and Signal Processing, May 26, 2013, 5 Pages.
Meng, et al., "Adversarial Speaker Adaptation", In Proceedings of IEEE International Conference on Acoustics, Speech and Signal Processing (ICASSP), 2019, pp. 5721-5725, 5 Pages.

Meng, et al., "Speaker-invariant Training via Adversarial Learning", In IEEE International Conference on Acoustics, Speech and Signal Processing (ICASSP), Apr. 15, 2018, 5 Pages.
Meng, et al., "Unsupervised Adaptation with Domain Separation Networks for Robust Speech Recognition", In Proceedings of IEEE Automatic Speech Recognition and Understanding Workshop, Dec. 16, 2017, 8 Pages.
Moran, Ben, "Kullback-leibler divergence asymmetry", Retrieved from: https://benmoran.wordpress.com/2012/07/14/kullback-leibler-divergence-asymmetry/, 2012, 6 Pages.
Neto, et al., "Speakeradaptation for hybrid hmm-ann continuous speech recognition system", In Proceedings of Eurospeech, 1995, 4 Pages.
Saon, et al., "Speaker adaptation of neural network acoustic models using i-vectors", In Proceedings of IEEE Workshop on Automatic Speech Recognition and Understanding, Dec. 8, 2013, pp. 55-59, 5 Pages.
Serdyuk, et al., "Invariant Representations for Noisy Speech Recognition", In Proceedings of the 30th Conference on Neural Information Processing Systems, Dec. 5, 2016, 5 Pages.
Shinohara, Yusuke, "Adversarial multi-task learning of deep neural networks for robust speech recognition", In Proceedings of International Speech Communication Association, Sep. 8, 2016, pp. 2369-2372, 4 Pages.
Sun, et al., "An unsupervised deep domain adaptation approach for robust speech recognition", In Journal of Neurocomputing, vol. 257, Sep. 27, 2017, pp. 1-9, 9 Pages.
Xue, et al., "Fast adaptation of deep neural network based on discriminant codes for speech recognition", In Proceedings of IEEE/ACM Transactions on Audio, Speech, and Language Processing, vol. 22, No. 12, Dec. 2014, pp. 1713-1725.
Xue, et al., "Restructuring of Deep Neural Network Acoustic Models with Singular Value Decomposition", In Interspeech, Aug. 25, 2013, 5 Pages.
Xue, et al., "Singular value decomposition based low-footprint speaker adaptation and personalization for deep neural network", In Proceedings of the IEEE International Conference on Acoustics, Speech and Signal Processing, May 4, 2014, 5 Pages.
Yu, et al., "KL-Divergence Regularized Deep Neural Network Adaptation for Improved Large Vocabulary Speech Recognition", In Proceedings of the IEEE International Conference on Acoustics Speech and Signal Processing, May 26, 2013, pp. 7893-7897, 5 Pages.
Yu, et al., "Recent progresses in deep learning based acoustic models", In IEEE/CAA Journal of Automatica Sinica, vol. 4, No. 3, Jul. 2017, pp. 400-412, 14 Pages.
Zhao, et al. "Low-rank plus diagonal adaptation for deep neural networks", In Proceedings of IEEE International Conference on Acoustics, Speech and Signal Processing, Mar. 20, 2016, pp. 5005-5009, 5 Pages.
Klejch, et al., "Learning to Adapt: A Meta-Learning Approach for Speaker Adaptation", In Interspeech Conference, Sep. 2, 2018, pp. 867-871.
"International Search Report and Written Opinion Issued in PCT Application No. PCT/US20/022875", dated Jul. 7, 2020, 11 Pages.

* cited by examiner

ADVERSARIAL SPEAKER ADAPTATION

CROSS-REFERENCE TO RELATED APPLICATIONS

The present application claims the benefit of U.S. Provisional Patent Application No. 62/834,564, filed Apr. 16, 2019, the entire contents of which are incorporated herein by reference for all purposes.

BACKGROUND

Deep neural network (DNN)-based acoustic models are commonly used to perform automatic speech recognition. Generally, such a deep neural network is trained to extract senone-discriminative features from input speech frames and to classify senones based on the input speech frames. However, speech recognition performance is not optimal if training data and runtime input data are acoustically mismatched.

Acoustic model adaptation may be used to address such mismatches. For example, a speaker-independent (SI) DNN acoustic model may perform well with respect to the speech of most speakers. Model adaptation attempts to adapt the SI DNN acoustic model into a personalized speaker-dependent (SD) DNN acoustic model associated with a given target speaker that achieves improved speech recognition performance when applied to speech of the given target speaker. Such speaker-based model adaptation is more challenging than other types of domain adaptation because the amount of available adaptation data (i.e., speech of the target speaker) is typically limited. Moreover, adaptation of an SI DNN model, which usually includes a large number of parameters, may cause the SD DNN to be overfitted to the limited adaptation data.

Improved speaker-based adaptation of SI DNN acoustic models used for speech recognition is desired. Such improvements may adapt a SI DNN acoustic model based on limited adaptation data while substantially maintaining the distribution of the SI DNN acoustic model, in order to provide improved performance with respect to a target speaker.

DETAILED DESCRIPTION

The following description is provided to enable any person in the art to make and use the described embodiments. Various modifications, however, will remain readily apparent to those of ordinary skill in the art.

Some embodiments provide an adversarial speaker adaptation scheme in which adversarial learning is applied to regularize the distribution of deep hidden features in a SD DNN acoustic model to be similar to that of a pre-trained SI DNN acoustic model. A discriminator network is used during the adversarial learning to distinguish deep features generated by the SD model from deep features generated by the SI model.

With the pre-trained SI model as the reference, and based on adaptation data (i.e., a target speaker's speech frames), the SD model is jointly optimized with the discriminator network to minimize the senone classification loss, and simultaneously to mini-maximize the SI/SD discrimination loss. Consequently, a senone-discriminative deep feature is learned in the SD model which exhibits a similar distribution to that of the pre-trained SI model. Using such a regularized and adapted deep feature, the SD model can provide improved automatic speech recognition on the target speaker's speech.

Figure 1:
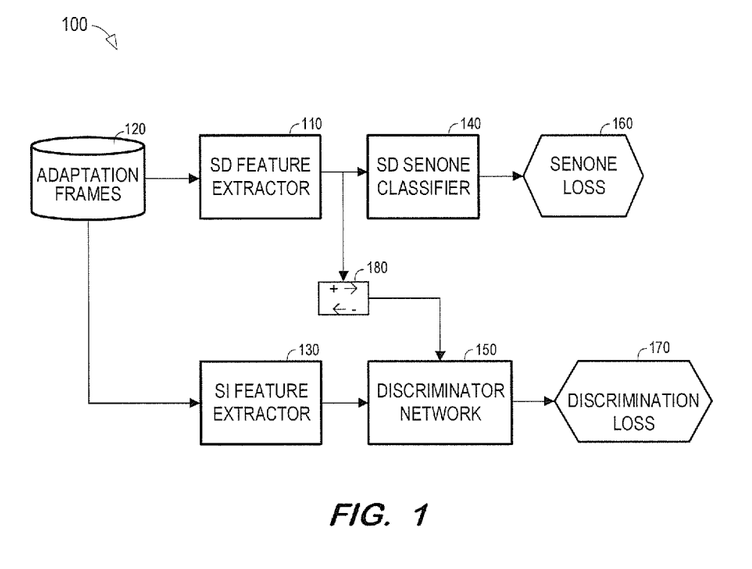
FIG. 1 is a block diagram of a system to train a SD acoustic model based on a SI feature extractor and feature discrimination according to some embodiments.

FIG. 1 illustrates system 100 according to some embodiments. System 100 may be used to train SD feature extractor 110 to learn senone-discriminative features based on adaptation frames 120 of a target speaker and exhibiting a distribution similar to the deep features of pre-trained SI feature extractor 130. SD senone classifier 140 predicts senone posteriors based on features received from SD feature extractor 110. Discriminator network 150 receives features generated based on adaptation frames 120 from SD feature extractor 110 and features generated based on adaptation frames 120 from SI feature extractor 130, and predicts whether the features were generated by SD feature extractor 110 or by SI feature extractor 130.

During training, SD feature extractor 110 receives adaptation frames 120 associated with a target speaker and maps the frames to intermediate deep hidden features. SD senone classifier 140 receives the intermediate deep hidden features and maps the features to senone posteriors. The parameters of SD feature extractor 110 and SD senone classifier 140 are optimized in order to minimize senone loss 160.

Also during training, pre-trained SI feature extractor 130 receives adaptation frames 120 and maps the frames to intermediate deep hidden features. Discriminator network 150 receives features from SD feature extractor 110 and from SI feature extractor 130 and predicts SD or SI posteriors based on the received deep hidden features, and the parameters of discriminator network 150 are optimized to minimize discrimination loss 170. Moreover, the parameters of SD feature extractor 110 are jointly trained with an adversarial objective to maximize discrimination loss 170. Such optimization is based on an understanding that the ability of discriminator network 150 to accurately discriminate between features generated by SD feature extractor 110 and SI feature extractor 130 domain is inversely related to the similarity of the distributions of the intermediate deep hidden features generated by each extractor.

In one example of adapting a SI DNN to a target speaker according to some embodiments, adaptation frames 120 include adaptation speech frames $X=\{x_1, \ldots, x_T\}, x_t \in R^{r_x}, t=1, \ldots, T$ of the target speaker and a sequence of senone labels $Y=\{y_1, \ldots, y_T\}$, $y_t \in R$ aligned with X. For supervised adaptation, Y is generated by aligning the adaptation data against a transcription generated using a previously well-trained SI DNN acoustic model. For unsupervised adaptation, the adaptation data is first decoded using the SI DNN acoustic model and the one-best path of the decoding lattice is used as Y.

The first few layers of the previously well-trained SI DNN acoustic model are viewed as a SI feature extractor network $M_f^{SI}$ (i.e., SI feature extractor 130) with parameters $\theta_f^{SI}$ and the upper layers of the SI DNN acoustic model are viewed as a SI senone classifier $M_y^{SI}$ with parameters $\theta_y^{SI}$. $M_f^{SI}$ maps input adaptation speech frames X to intermediate SI deep hidden features $F^{SI}=\{f_1^{SI}, \ldots, f_T^{SI}\}$, $f_t^{SI} \in R^{r_f}$, i.e., $f_t^{SI}=M_f^{SI}(x_t)$. $M_y^{SI}$ maps the deep hidden features $F^{SI}$ to the senone posteriors $p(s|f_t^{SI};\theta_y^{SI}), s \in S$ as follows:

$$M_y^{SI}(f_t^{SI})=p(s|x_t;\theta_f^{SI},\theta_y^{SI})$$

An SD DNN acoustic model to be trained using speech from a target speaker is initialized from the SI DNN acoustic model. According to some embodiments, $M_f^{SI}$ (i.e., SI feature extractor 130) is used to initialize SD feature extractor $M_f^{SD}$ (i.e., SD feature extractor 110) with parameters $\theta_f^{SD}$ and $M_y^{SI}$ is used to initialize SD senone classifier $M_y^{SD}$ (i.e., SD senone classifier 140) with parameters $\theta_y^{SD}$. Accordingly, in the SD acoustic model, $M_f^{SD}$ maps $x_t$ to SD deep features $f_t^{SD}$ and $M_y^{SD}$ further transforms $f_t^{SD}$ to a same set of senone posteriors $p(s|f_t^{SD};\theta_y^{SD}), s \in S$ as follows:

$$M_y^{SD}(f_t^{SD})=M_y^{SD}(M_f^{SD}(x_t))=p(s|x_t;\theta_f^{SD},\theta_y^{SD})$$

To adapt the SI model to the speech X of the target speaker, the initialized SD model is trained by minimizing the cross-entropy senone classification loss between the predicted senone posteriors and the senone labels Y as follows:

$$\mathcal{L}_{senone}(\theta_f^{SD}, \theta_y^{SD}) = -\frac{1}{T}\sum_{t=1}^{T} \log p(y_t | x_t; \theta_f^{SD}; \theta_y^{SD}) = -\frac{1}{T}\sum_{t=1}^{T}\sum_{s \in S} 1\lfloor s = y_t \rfloor \log M_y(M_f^{SD}(x_t))$$

where $1\lfloor \cdot \rfloor$ is the indicator function which equals 1 if the condition in the squared bracket is true and 0 otherwise.

As described above, due to the typically limited amount of adaptation data X (e.g., adaptation frames 120), a thusly-adapted SD model may become overfitted to the adaptation data X. Some embodiments address this issue by converging the distribution of deep hidden features $F^{SD}$ of the SD model to that of the deep hidden features $F^{SI}$ of the SI model, while minimizing the senone loss $\mathcal{L}_{senone}$ as follows:

$$p(F^{SD} | X; \theta_f^{SD}) \to p(F^{SI} | X; \theta_f^{SI})$$

$$\min_{\theta_f^{SD}, \theta_y^{SD}} \mathcal{L}_{senone}(\theta_f^{SD}, \theta_y^{SD})$$

The above convergence is promoted using a discriminator network $M_d$ (i.e., discriminator network 150) with parameters $\theta_d$ which takes $F^{SD}$ and $F^{SI}$ as input and outputs the posterior probability that an input deep feature is generated by the SD model, i.e., $$M_d(f_t^{SD})=p(f_t^{SD} \in D_{SD}|x_t;\theta_f^{SD},\theta_d)$$

$$M_d(f_t^{SI})=1-p(f_t^{SI} \in D_{SI}|x_t;\theta_f^{SI},\theta_d)$$

where $D_{SD}$ and $D_{SI}$ denote the sets of SD and SI deep features, respectively.

The discrimination loss (e.g., discrimination loss 170) $\mathcal{L}_{disc}(\theta_f,\theta_d)$ for $M_d$ may be formulated below using cross-entropy:

$$\mathcal{L}_{disc}(\theta_f^{SD}, \theta_f^{SI}, \theta_d) =$$
$$-\frac{1}{T}\sum_{t=1}^{T} [\log p(f_t^{SD} \in D_{SD} | x_t; \theta_f^{SD}, \theta_d) + \log p(f_t^{SI} \in D_{SI} | x_t; \theta_f^{SI}, \theta_d)] =$$
$$-\frac{1}{T}\sum_{t=1}^{T} \{\log M_d(M_f^{SD}(x_t)) + \log[1 - M_d(M_f^{SI}(x_t))]\}$$

To make the distribution of $F^{SD}$ similar to that of $F^{SI}$, adversarial training of $M_f^{SD}$ and $M_d$ is performed to minimize $\mathcal{L}_{disc}$ with respect to $\theta_d$ and maximize $\mathcal{L}_{disc}$ with respect to $\theta_f^{SD}$. This minimax competition will first increase the capability of $M_f^{SD}$ to generate $F^{SD}$ with a distribution similar to that of $F^{SI}$ and increase the discrimination capability of $M_d$. It will eventually converge to the point where $M_f^{SD}$ generates $F^{SD}$ such that $M_d$ is unable to determine whether $F^{SD}$ is generated by $M_f^{SD}$ or $M_f^{SI}$. At such a point, the SD model has been regularized such that its distribution is substantially similar to the SI model.

Moreover, because the SD feature extractor $M_f^{SD}$ is also to produce senone-discriminative features, the acoustic model network consisting of the SD feature extractor and the SD senone classifier, and the discriminator network are trained to jointly optimize the primary task of senone classification and the secondary task of SD/SI classification with an adversarial objective function as follows:

$$(\hat{\theta}_f^{SD}, \hat{\theta}_y^{SD}) = \arg\min_{\theta_f^{SD}, \theta_y^{SD}} \mathcal{L}_{senone}(\theta_f^{SD}, \theta_y^{SD}) - \lambda \mathcal{L}_{disc}(\theta_f^{SD}, \theta_f^{SI}, \hat{\theta}_d)$$

$$(\hat{\theta}_d) = \arg\min_{\theta_d} \mathcal{L}_{disc}(\hat{\theta}_f^{SD}, \theta_f^{SI}, \theta_d)$$

where $\lambda$ controls the trade-off between the senone classification loss $\mathcal{L}_{senone}$ and the discriminator loss $\mathcal{L}_{disc}$, and $\hat{\theta}_f^{SD}, \hat{\theta}_y^{SD}$ and $\hat{\theta}_d$ are the optimized network parameters. The SI model only serves as a reference during training and its parameters $\theta_f^{SI}, \theta_y^{SI}$ are fixed throughout training.

Figure 2:
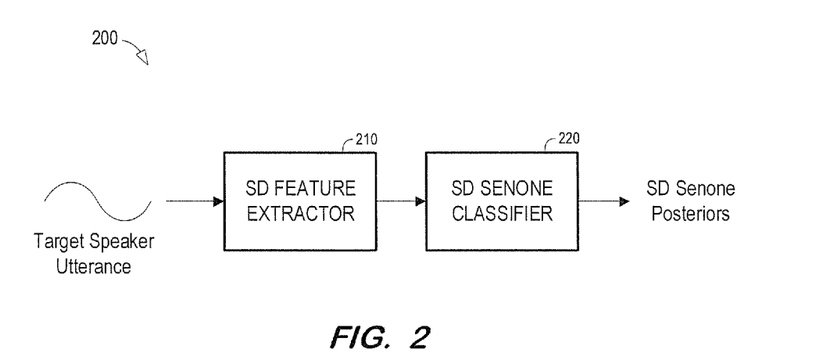
FIG. 2 is a block diagram of a system to recognize speech using a SD feature extractor trained in accordance with some embodiments.

These parameters may be updated during training via back propagation with stochastic gradient descent as follows:

$$\theta_f^{SD} \leftarrow \theta_f^{SD} - \mu \left[\frac{\partial \mathcal{L}_{senone}}{\partial \theta_f^{SD}} - \lambda \frac{\partial \mathcal{L}_{disc}}{\partial \theta_f^{SD}}\right]$$

$$\theta_d \leftarrow \theta_d - \mu \frac{\partial \mathcal{L}_{disc}}{\partial \theta_d}$$

$$\theta_y^{SD} \leftarrow \theta_y^{SD} - \mu \frac{\partial \mathcal{L}_{senone}}{\partial \theta_y^{SD}}$$

where $\mu$ is the learning rate. The negative coefficient $-\lambda$ induces a reversed gradient that maximizes $\mathcal{L}_{disc}(\theta_f^{SD},\theta_d)$ to result in speaker-invariant deep features. Gradient reversal layer 280 may provide an identity transform in the forward propagation and multiply the gradient by $-\lambda$. during the backward propagation.

The optimized DNN acoustic model consisting of $M_f^{SD}$ (e.g., SD feature extractor 110 and $M_y^{SD}$ (e.g., SD senone classifier 140) are used for automatic speech recognition of target speaker speech, while $M_f^{SI}$ (e.g., SI feature extractor 130) and $M_d$ (e.g., discriminator network 150) are discarded after parameter training. FIG. 2 shows system 200 including SD feature extractor 210 and SD senone classifier 220 including trained parameters $\hat{\theta}_f^{SD}$ and $\hat{\theta}_y^{SD}$, respectively, according to some embodiments.

SD feature extractor 210 receives input utterance of a target speaker (i.e., the target speaker whose utterances were used as adaptation data to train parameters $\hat{\theta}_f^{SD}$ and $\hat{\theta}_y^{SD}$) and operates as trained to generate substantially speaker-invariant and senone-discriminative frame-level deep hidden features. SD senone classifier 220 receives the features and also operates according to its trained parameters to produce posterior features for each frame f, which provide statistical likelihoods that the frame f is generated by various senones. The posteriors may be used in various embodiments to identify words represented by the utterance, for example, to determine whether a key phrase is present, to identify the content of a command or query, to perform transcription, etc.

Figure 3:
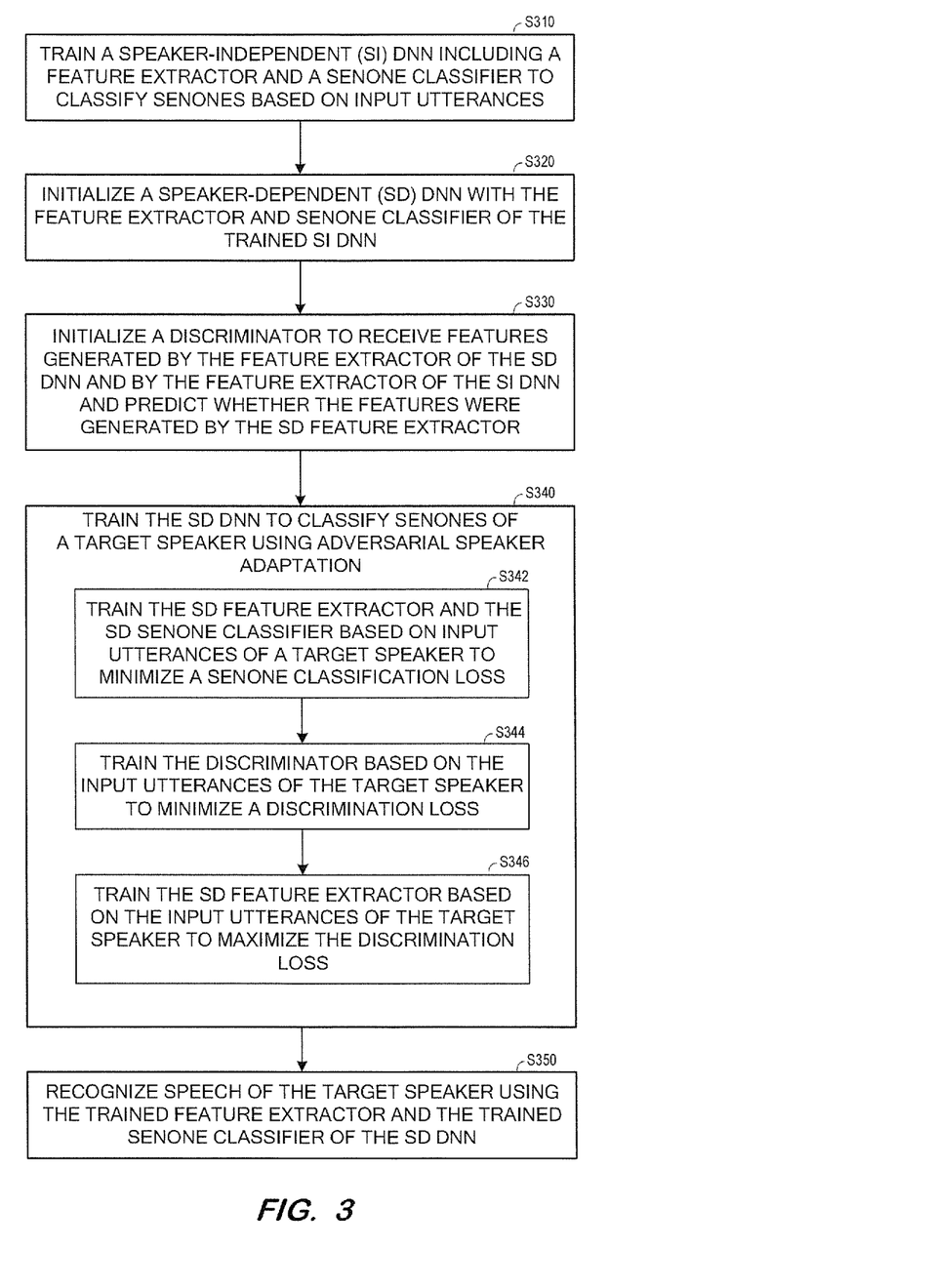
FIG. 3 is a flow diagram of a process to train a SD acoustic model based on a SI feature extractor according to some embodiments.

FIG. 3 is a flow diagram of a process to train a SD DNN acoustic model to generate senone-discriminative features according to some embodiments. The FIG. 3 process and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

Figure 4:
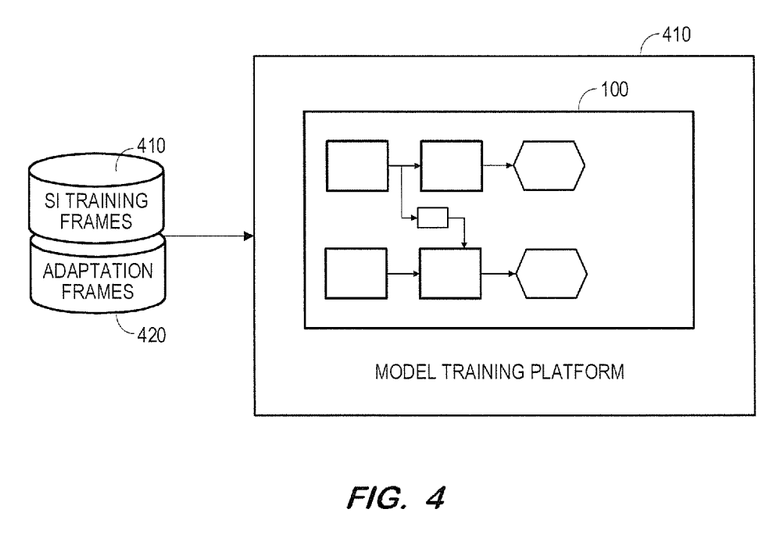
FIG. 4 is a block diagram of a system to train a SI acoustic model for speech recognition according to some embodiments.

Initially, at S310, a SI DNN including a feature extractor and a senone classifier is trained to classify senones based on input utterances. FIG. 4 illustrates training of a system according to some embodiments. Model training platform 410 may comprise any suitable system to instantiate and train one or more artificial neural networks of any type. Generally, model training platform 410 operates to input training data to a system of one or more DNNs, evaluate the resulting output of the system with respect to training objectives, modify parameters of the DNNs accordingly, and repeat the process until the training objectives are sufficiently met.

Figure 5:
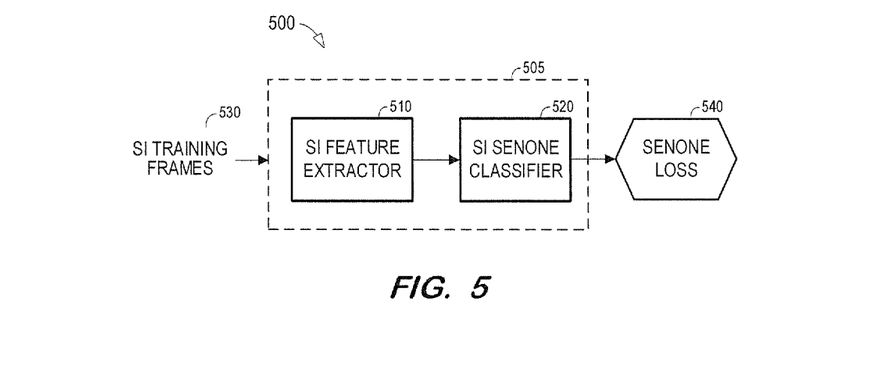
FIG. 5 is a block diagram to illustrate training of a SI acoustic model according to some embodiments.

FIG. 5 illustrates system 500 implemented by platform 410 at S310 of process 300. System 500 includes SI DNN 505 consisting of SI feature extractor 510 and SI senone classifier 520. The training data comprises a plurality of pre-captured utterances of a plurality of speakers and senones (e.g., in text format) represented by each utterance. Platform 410 controls training of SI DNN 505 (i.e., of the parameters of SI feature extractor 510 and SI senone classifier 520) to minimize senone loss 540.

In one non-exhaustive example of S410, SI feature extractor 510 and SI senone classifier 520 are implemented as a long short-term memory (LSTM) hidden Markov model (HMM) acoustic model. A neural network (e.g., deep learning, deep convolutional, or recurrent) according to some embodiments comprises a series of "neurons," such as LSTM nodes, arranged into a network. A neuron is an architecture used in data processing and artificial intelligence, particularly machine learning, that includes memory that may determine when to "remember" and when to "forget" values held in that memory based on the weights of inputs provided to the given neuron. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors, a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. Neurons and neural networks may be constructed programmatically (e.g., via software instructions) or via specialized hardware linking each neuron to form the neural network.

SI DNN 505 may include 4 hidden layers and 1024 hidden units within each layer. A 512-dimensional projection layer is inserted on top of each hidden layer to reduce the number of parameters. The output layer of the LSTM includes 5980 output units corresponding to 5980 senone labels. There is no frame stacking, and the output MINI senone label is delayed by 5 frames. 80-dimensional log Mel filterbank features are extracted from the SI training frames and are fed as the input to the LSTM after global mean and variance normalization.

Next, at S320, a SD DNN is initialized with the feature extractor and the senone classifier of the trained SI DNN. For example, SI feature extractor network 510 ($M_f^{SI}$) is identified as the first $N_h$ layers of the trained SI DNN 505 and SI senone classifier 520 ($M_y^{SI}$) is formed as the remaining (e.g., 4–$N_h$) trained layers and the trained output layer. $N_h$ indicates the position of the deep hidden features in the SI and SD acoustic models. A SD feature extractor network $M_f^{SD}$ and a SD senone classifier $M_y^{SD}$ are then cloned from $M_f^{SI}$ and $M_y^{SI}$.

At S330, a discriminator ($M_d$) is initialized to receive features generated by the SD feature extractor $M_f^{SD}$ and features generated by the SI feature extractor $M_f^{SI}$ and to predict whether a received feature extractor was generated by the SD feature extractor $M_f^{SD}$. $M_d$ may comprise a feedforward DNN including a 512-dimensional input layer, 2 hidden layers and 512 hidden units for each layer. The output layer of $M_d$ may include 1 unit predicting the posteriors of input deep features generated by the SD feature extractor $M_f^{SD}$.

$M_f^{SD}$, $M_y^{SD}$, and $M_d$ are jointly trained at S340 with an adversarial multi-task objective. Platform 410 of FIG. 4 illustrates such joint training of system 100 according to some embodiments.

In particular, at S342, $F^{SD}$ is made senone-discriminative by training the SD feature extractor $M_f^{SD}$ and the SD senone classifier $M_y^{SD}$ based on adaptation frames 420 of a target speaker to minimize the cross-entropy senone classification loss between the predicted senone posteriors and the senone labels as described above. Simultaneously, at S344, to make the distribution of $F^{SD}$ similar to that of $F^{SI}$, the discriminator $M_d$ is trained at S344 to minimize $\mathcal{L}_{disc}$ with respect to $\theta_d$ and the SD feature extractor $M_f^{SD}$ is trained at S346 to maximize $\mathcal{L}_{disc}$ with respect to $\theta_f^{SD}$.

Figure 6:
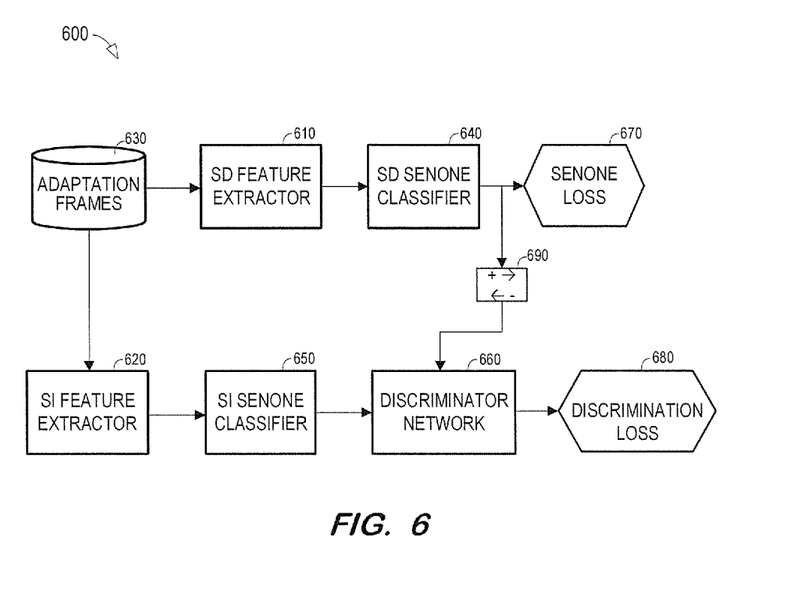
FIG. 6 is a block diagram of a system to train a SD acoustic model based on a SI acoustic model and senone posterior discrimination according to some embodiments.

FIG. 6 illustrates system 600 to train a SD DNN acoustic model according to some embodiments. System 600 includes SI senone classifier 650, which consists of the upper layers of a previously-trained SI DNN acoustic model from which SI feature extractor 650 was formed. Accordingly, SI feature extractor 620 and SI senone classifier 650 represent the previously-trained SI DNN acoustic model.

Moreover, discriminator network 660 receives senone posteriors from SD senone classifier 640 and from SI senone classifier 650. Discriminator network 660 may therefore output posteriors predicting whether received senone posteriors were generated by SD senone classifier 640 or from SI senone classifier 650.

According to the FIG. 6 embodiment, SD feature extractor 610 ($M_f^{SD}$) and SD senone classifier 640 ($M_y^{SD}$) are trained at S342 based on adaptation frames 630 of a target speaker to minimize the cross-entropy senone classification loss between the predicted senone posteriors and the senone labels as described above. Simultaneously, to make the distribution of $F^{SD}$ similar to that of $F^{SI}$, discriminator 660 ($M_d$) is trained at S344 to minimize discriminator loss 680 ($\mathcal{L}_{disc}$) with respect to $\theta_d$ and SD feature extractor 610 ($M_f^{SD}$) and SD senone classifier 640 ($M_y^{SD}$) are both trained at S346 to maximize discriminator loss 680 ($\mathcal{L}_{disc}$) with respect to $\theta_f^{SD}$ and $\theta_y^{SD}$.

The thusly-trained acoustic model consisting of $M_f^{SD}$ and $M_y^{SD}$ may then be used at S350 to recognize speech of the recognition. The trained acoustic model can be used as a component of an automatic speech recognition unit in any number of different types of devices and systems. For example, automatic speech recognition using the trained acoustic model can be implemented in digital assistants, chatbots, voice control applications, and other related devices and systems including in associated voice services such as software development kit (SDK) offerings. Automatic speech recognition services using the trained acoustic model can be implemented in cloud architectures. A chatbot is a program that can conduct conversations via auditory or textual methods. A bot is a program that can access web sites and gather content based on a provided search index. The web sites can be coupled to the Internet, an intranet, or the web sites may be databases, each database accessible by its own addresses according to a protocol for the respective database.

Figure 7:
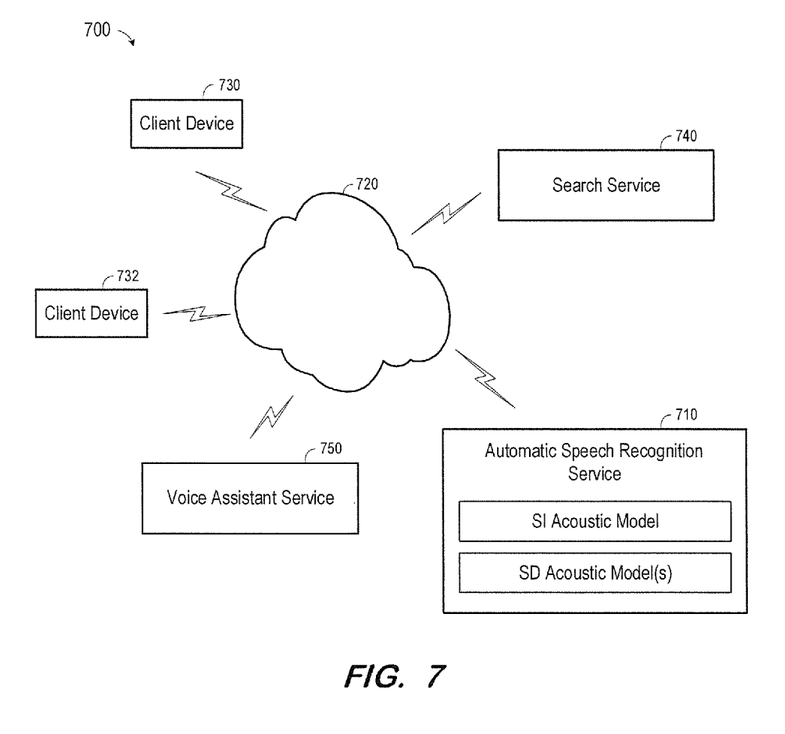
FIG. 7 is a block diagram of a cloud computing architecture providing speech recognition services according to some embodiments.

FIG. 7 illustrates architecture 700 providing speech recognition services according to some embodiments. System 700 may be cloud-based and components thereof may be implemented using on-demand virtual machines, virtual servers and cloud storage instances. Such cloud-based components may be connected to the Internet and/or to any network or combinations of networks. A cloud can include a wide area network (WAN) like the public Internet or a private, national or global network, and may include a local area network (LAN) within an organization providing the services of the data center.

As shown, automatic speech recognition service 710 may be implemented as a cloud service providing transcription of speech audio signals received over cloud 720. Automatic speech recognition service 710 may include a SI acoustic model trained using any suitable training system and one or more SD acoustic models trained as described above. Each of the one or more SD acoustic models may be usable to recognize the speech of a respective target speaker.

Each of client devices 730 and 732 may be operated to request services such as search service 740 and voice assistant service 750. Services 740 and 750 may, in turn, request automatic speech recognition functionality from automatic speech recognition service 710. Such a request may include an identifier of a target speaker and/or adaptation data (e.g., utterances) associated with the target speaker. Using such an identifier and/or data, service 710 may identify a SD acoustic model associated with the target speaker or adapt the SI acoustic model to generate a SD acoustic model associated with the target speaker. Service 710 may then use the identified and/or generated SD acoustic model to perform automatic speech recognition on speech of the target speaker.

Figure 8:
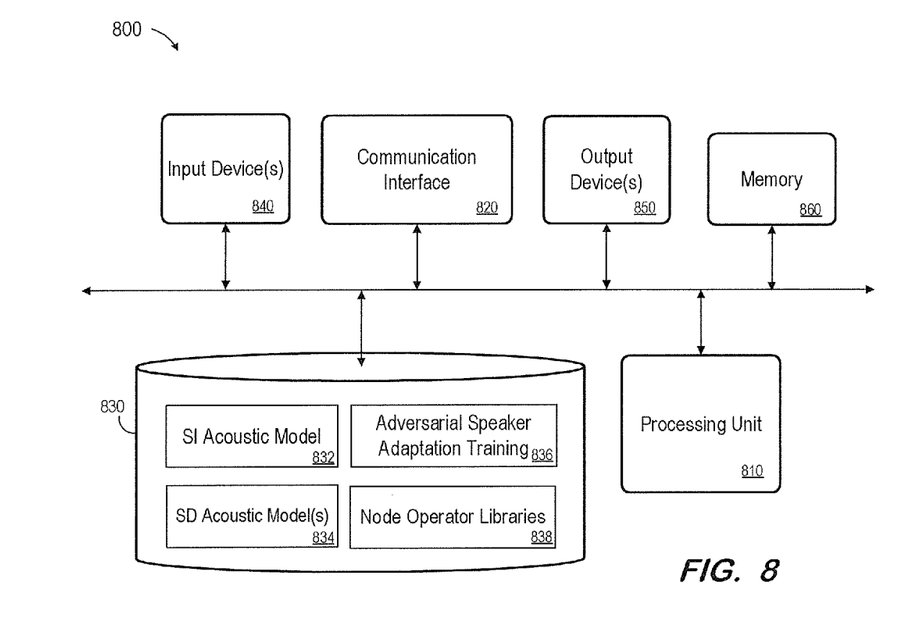
FIG. 8 is a block diagram of a system to provide SD automatic speech recognition according to some embodiments.

FIG. 8 is a block diagram of system 800 according to some embodiments. System 800 may comprise a general-purpose server computer and may execute program code to provide an automatic speech recognition service as described herein. System 800 may be implemented by a cloud-based virtual server according to some embodiments.

System 800 includes processing unit 810 operatively coupled to communication device 820, persistent data storage system 830, one or more input devices 840, one or more output devices 850 and volatile memory 860. Processing unit 810 may comprise one or more processors, processing cores, etc. for executing program code. Communication interface 820 may facilitate communication with external devices, such as client devices, and data providers as described herein. Input device(s) 840 may comprise, for example, a keyboard, a keypad, a mouse or other pointing device, a microphone, a touch screen, and/or an eye-tracking device. Output device(s) 850 may comprise, for example, a display (e.g., a display screen), a speaker, and/or a printer.

Data storage system 830 may comprise any number of appropriate persistent storage devices, including combinations of magnetic storage devices (e.g., magnetic tape, hard disk drives and flash memory), optical storage devices, Read Only Memory (ROM) devices, etc. Memory 860 may comprise Random Access Memory (RAM), Storage Class Memory (SCM) or any other fast-access memory.

Trained SI acoustic model 832 may comprise program code executed by processing unit 810 to cause system 800 to recognize senones based on input speech signals using senone-discriminative deep features as described herein. Trained SD acoustic models 834 may be associated with respective target speakers and may be adapted from SI acoustic model 832 based on adaptation data of the target speakers as described herein. Accordingly, SD acoustic models 834 may comprise program code executed by processing unit 810 to cause system 800 to recognize senones based on input speech signals of the target speakers.

Adversarial speaker adaptation training 836 may comprise program code executed by processing unit 810 to cause system 800 to train a SD acoustic model based on a SI acoustic model as described herein. Node operator libraries 838 may comprise program code to execute functions of neural network nodes based on parameter values. Data storage device 830 may also store data and other program code for providing additional functionality and/or which are necessary for operation of system 800, such as device drivers, operating system files, etc.

Each functional component and process described herein may be implemented at least in part in computer hardware, in program code and/or in one or more computing systems executing such program code as is known in the art. Such a computing system may include one or more processing units which execute processor-executable program code stored in a memory system.

Processor-executable program code embodying the described processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Embodiments are not limited to the examples described below.

The foregoing diagrams represent logical architectures for describing systems according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

The diagrams described herein do not imply a fixed order to the illustrated methods, and embodiments may be practiced in any order that is practicable. Moreover, any of the methods described herein may be performed by hardware, software, or any combination of these approaches. For example, a computer-readable storage medium may store thereon instructions which when executed by a machine result in performance of methods according to any of the embodiments described herein.

Those in the art will appreciate that various adaptations and modifications of the above-described embodiments can be configured without departing from the claims. Therefore, it is to be understood that the claims may be practiced other than as specifically described herein.

What is claimed is:

1. A system comprising:
    a processing unit; and
    a memory storage device including program code that when executed by the processing unit causes to the system to:
        train first parameters of a speaker-independent acoustic model to classify senones based on input speech frames;
        initialize second parameters of a speaker-dependent acoustic model with the first parameters of the speaker-independent acoustic model;
        initialize a discriminator to receive data from the speaker-dependent acoustic model and data from the speaker-independent acoustic model and to output a prediction of whether received data was generated by the speaker-dependent acoustic model based on third parameters of the discriminator;
        determine a senone classification loss associated with the second parameters of the speaker-dependent acoustic model;
        determine a discrimination loss associated with the discriminator;
        train the second parameters of the speaker-dependent acoustic model based on input frames of a target speaker to minimize the senone classification loss;
        train a portion of the second parameters of the speaker-dependent acoustic model based on the input frames of the target speaker to maximize the discrimination loss; and
        train the third parameters of the discriminator based on the input frames of the target speaker to minimize the discrimination loss.

2. The system of claim 1, wherein training of the second parameters of the speaker-dependent acoustic model based on input frames of a target speaker to minimize the senone classification loss, training of the portion of the second parameters of the speaker-dependent acoustic model based on the input frames of the target speaker to maximize the discrimination loss, and training of the discriminator based on the input frames of the target speaker to minimize the discrimination loss occur substantially simultaneously.

3. The system of claim 1, wherein the first parameters of the speaker-independent acoustic model comprise fourth parameters of a speaker-independent feature extractor and fifth parameters of a speaker-independent senone classifier,
    wherein the second parameters of the speaker-dependent acoustic model comprise sixth parameters of a speaker-dependent feature extractor and seventh parameters of a speaker-dependent senone classifier,
    wherein the discriminator is to receive data from the speaker-dependent feature extractor and data from the speaker-independent feature extractor and to output a prediction of whether received data was generated by the speaker-dependent feature extractor based on the third parameters of the discriminator.

4. The system of claim 3, wherein training of the second parameters of the speaker-dependent acoustic model comprises training of the sixth parameters and training of the seventh parameters based on input frames of a target speaker to minimize the senone classification loss, and
    wherein training of the second parameters of the speaker-dependent acoustic model comprises training of the sixth parameters based on the input frames of the target speaker to maximize the discrimination loss.

5. The system of claim 4, wherein training of the sixth parameters and the seventh parameters of the speaker-dependent acoustic model based on the input frames of the target speaker to minimize the senone classification loss, training of the sixth parameters of the speaker-dependent acoustic model based on the input frames of the target speaker to maximize the discrimination loss, and training of the discriminator based on the input frames of the target speaker to minimize the discrimination loss occur substantially simultaneously.

6. The system according to claim 5, wherein the fourth, fifth and seventh parameters are fixed during training of the sixth parameters based on the input frames of the target speaker to maximize the discrimination loss.

7. The system according to claim 1, the program code when executed by the processing unit causes to the system to:
    perform speech recognition on input speech of the target speaker using the trained second parameters of the speaker-dependent acoustic model.

8. A computer-implemented method comprising:
    training first parameters of a speaker-independent acoustic model to classify senones based on input speech frames;
    initializing second parameters of a speaker-dependent acoustic model with the first parameters of the speaker-independent acoustic model;
    initializing a discriminator to receive data from the speaker-dependent acoustic model and data from the speaker-independent acoustic model and to output a prediction of whether received data was generated by the speaker-dependent acoustic model based on third parameters of the discriminator;

training the second parameters of the speaker-dependent acoustic model based on input frames of a target speaker to minimize a senone classification loss associated with the second parameters of the speaker-dependent acoustic model;

training a portion of the second parameters of the speaker-dependent acoustic model based on the input frames of the target speaker to maximize a discrimination loss associated with the discriminator; and training the third parameters of the discriminator based on the input frames of the target speaker to minimize the discrimination loss.

9. The method of claim 8, wherein training of the second parameters of the speaker-dependent acoustic model based on input frames of the target speaker to minimize the senone classification loss, training of the portion of the second parameters of the speaker-dependent acoustic model based on the input frames of the target speaker to maximize the discrimination loss, and training of the discriminator based on the input frames of the target speaker to minimize the discrimination loss occur substantially simultaneously.

10. The method of claim 8, wherein the first parameters of the speaker-independent acoustic model comprise fourth parameters of a speaker-independent feature extractor and fifth parameters of a speaker-independent senone classifier, wherein the second parameters of the speaker-dependent acoustic model comprise sixth parameters of a speaker-dependent feature extractor and seventh parameters of a speaker-dependent senone classifier, wherein the discriminator is to receive data from the speaker-dependent feature extractor and data from the speaker-independent feature extractor and to output a prediction of whether received data was generated by the speaker-dependent feature extractor based on the third parameters of the discriminator.

11. The method of claim 10, wherein training the second parameters of the speaker-dependent acoustic model comprises training the sixth parameters and training the seventh parameters based on input frames of a target speaker to minimize the senone classification loss, and wherein training the second parameters of the speaker-dependent acoustic model comprises training the sixth parameters based on the input frames of the target speaker to maximize the discrimination loss.

12. The method of claim 11, wherein training the sixth parameters and the seventh parameters of the speaker-dependent acoustic model based on the input frames of the target speaker to minimize the senone classification loss, training the sixth parameters of the speaker-dependent acoustic model based on the input frames of the target speaker to maximize the discrimination loss, and training the discriminator based on the input frames of the target speaker to minimize the discrimination loss occur substantially simultaneously.

13. The method according to claim 12, wherein the fourth, fifth and seventh parameters are fixed during training of the sixth parameters based on the input frames of the target speaker to maximize the discrimination loss.

14. The method according to claim 8, further comprising:
performing speech recognition on input speech of the target speaker using the trained second parameters of the speaker-dependent acoustic model.

15. A non-transient, computer-readable medium storing program code to be executed by a processing unit to provide:

a speaker-independent acoustic model capable of classifying senones based on input speech frames and on first parameters of the speaker-independent acoustic model;

a speaker-dependent acoustic model capable of classifying senones based on input speech frames and on second parameters of the speaker-dependent acoustic model;

a discriminator capable of receiving data from the speaker-dependent acoustic model and data from the speaker-independent acoustic model and outputting a prediction of whether received data was generated by the speaker-dependent acoustic model based on third parameters of the discriminator; and a training platform to:

initialize the second parameters of the speaker-dependent acoustic model based on the first parameters of the speaker-independent acoustic model;

train the second parameters of the speaker-dependent acoustic model based on input frames of a target speaker to minimize a senone classification loss associated with the second parameters of the speaker-dependent acoustic model;

train a portion of the second parameters of the speaker-dependent acoustic model based on the input frames of the target speaker to maximize a discrimination loss associated with the discriminator; and train the third parameters of the discriminator based on the input frames of the target speaker to minimize the discrimination loss.

16. The medium of claim 15, wherein training of the second parameters of the speaker-dependent acoustic model based on input frames of the target speaker to minimize the senone classification loss, training of the portion of the second parameters of the speaker-dependent acoustic model based on the input frames of the target speaker to maximize the discrimination loss, and training of the discriminator based on the input frames of the target speaker to minimize the discrimination loss occur substantially simultaneously.

17. The medium of claim 15, wherein the first parameters of the speaker-independent acoustic model comprise fourth parameters of a speaker-independent feature extractor and fifth parameters of a speaker-independent senone classifier, wherein the second parameters of the speaker-dependent acoustic model comprise sixth parameters of a speaker-dependent feature extractor and seventh parameters of a speaker-dependent senone classifier, wherein the discriminator is capable of receiving data from the speaker-dependent feature extractor and data from the speaker-independent feature extractor and outputting a prediction of whether received data was generated by the speaker-dependent feature extractor based on the third parameters of the discriminator.

18. The medium of claim 17, wherein training the second parameters of the speaker-dependent acoustic model comprises training the sixth parameters and training the seventh parameters based on input frames of a target speaker to minimize the senone classification loss, and wherein training the second parameters of the speaker-dependent acoustic model comprises training the sixth parameters based on the input frames of the target speaker to maximize the discrimination loss.

19. The medium of claim 18, wherein training the sixth parameters and the seventh parameters of the speaker-dependent acoustic model based on the input frames of the target speaker to minimize the senone classification loss, training the sixth parameters of the speaker-dependent acoustic model based on the input frames of the target speaker to maximize the discrimination loss, and training the discriminator based on the input frames of the target speaker to minimize the discrimination loss occur substantially simultaneously.

20. The medium of claim 19, wherein the fourth, fifth and seventh parameters are fixed during training of the sixth parameters based on the input frames of the target speaker to maximize the discrimination loss.

* * * * *